Figure 1:
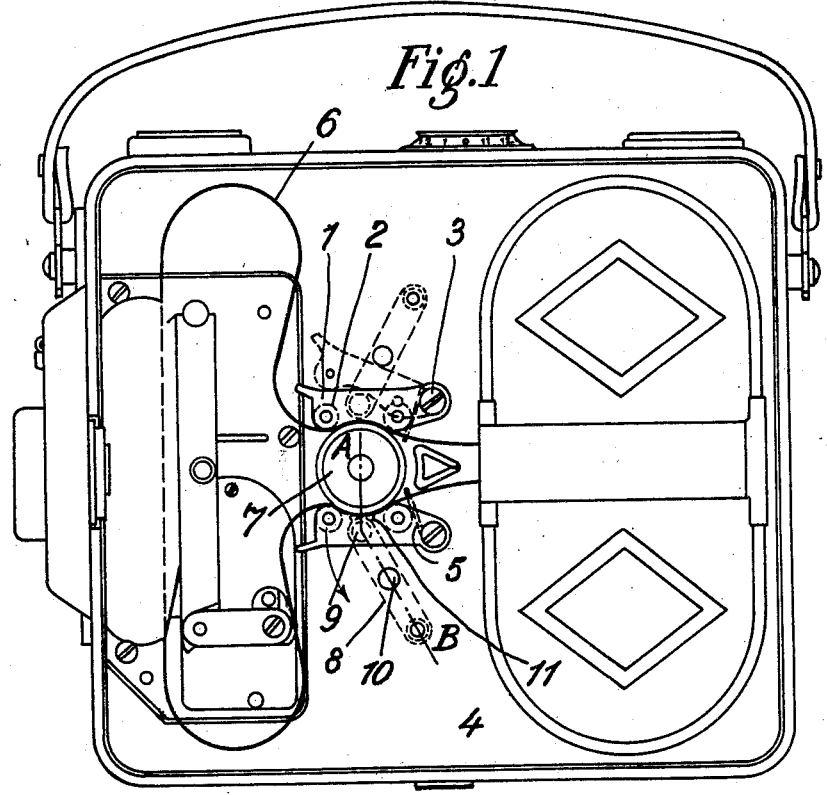

May 19, 1931. L. GOLDHAMMER 1,805,579

FILM TRANSPORTING DEVICE IN A MOTION PICTURE APPARATUS

Filed July 8, 1929

Leo Goldhammer, Inventor,
By Philip S. Hopkins, Attorney

Patented May 19, 1931

1,805,579

UNITED STATES PATENT OFFICE

LEO GOLDHAMMER, OF MUNICH, GERMANY, ASSIGNOR TO AGFA ANSCO CORPORATION, OF BINGHAMTON, NEW YORK, A CORPORATION OF NEW YORK

FILM TRANSPORTING DEVICE IN A MOTION PICTURE APPARATUS

Application filed July 8, 1929, Serial No. 376,765, and in Germany July 10, 1928.

The present invention relates to a film transporting device in a motion picture taking or projecting apparatus. More particularly it relates to an improvement of the device for threading the film between a film transporting drum and the pressure rollers guiding the film along the transporting drum.

I have found it to be advantageous that the pivotally mounted holder containing the pressure rollers is not pressed by means of a spring towards the transporting drum in its operative position but that, on the contrary, the roller-holder, by means of a spring, normally is pressed away from the transporting drum in its open position and that the roller-holder is locked in its operative position at a certain distance from the transporting drum against the pressure of the said spring. By such arrangement the film is much easier placed between the transporting drum and the pressure rollers than when the roller-holder must be kept away from the transporting drum. A further advantage of my invention is that when the apparatus is working, the film never is too much pressed against the transporting drum which occurs usually in the known film transporting devices. Thus the film is easily threaded in the guiding way in such a manner that the perforations properly cooperate with the teeth of the transporting drum and the film is protected against excessive pressure between the transporting drum and the pressure rollers.

When introducing the film, the holder of the pressure rollers is loosened and the holder is swung off from the transporting drum by the springs. The sweep of the holder is limited in each case by some stop.

According to my invention, the locking device consists of a leaf-spring which is fastened underneath the base-plate on which the holder containing the pressure rollers is mounted, said leaf-spring being provided with a locking pin and with a releasing button. The greater part of the locking device is thus situated outside the film-chamber, i. e., the chamber which, as is known, contains the transporting drum and the filmspools (or magazines).

A further feature of my invention is to arrange the releasing button which projects into the film-chamber so as to serve simultaneously as a limit for the sweep of the holder of the pressure rollers. This arrangement offers the advantage that no interfering elements, such as, for instance, swinging arms or levers impede the introduction of the film so that it is possible to watch well the proper working of the teeth of the transporting drum into the perforations of the film.

The accompanying drawings show by way of example one mode of executing the present invention.

Figure 2:
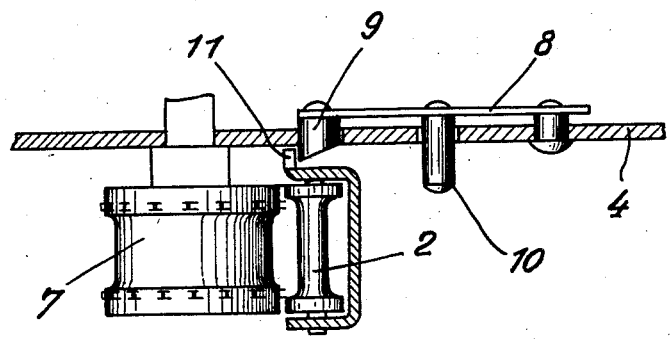

Fig. 1 being a side view of a motion picture apparatus while open,

Fig. 2 being a section on the line A—B (compare Fig. 1).

One end of the holder 1 of the pressure rollers 2 guiding the film along the transporting drum 7 is pivotally mounted by means of a bolt 3 to the baseplate 4 so that it can be swung off. Upon each holder 1 a spring 5 acts which tends to turn the holders 1 in the direction of the arrow (compare Fig. 1) away from the transporting drum. Underneath the base-plate 4 a leaf-spring 8 is fastened which is provided with a locking pin 9 and a releasing button 10. The said pin and button project through openings of the baseplate into the sweep of the holder of the rollers. The locking pin 9 is flattened towards one side, so that the stop 11 on the pressure roller-holder 1 can slide over the locking pin in the direction opposite to that of the arrow. It is useful to arrange the releasing button so that it may serve at the same time as a limit for the sweep of the holder 1 for the pressure rollers.

When introducing the film 6 between the transporting drum 7 and the pressure rollers 2, the locking device of the holder of the rollers is released by pressing the button 10, so that the holder 1 pressed by the spring 5 swings into the position marked in the drawings by a dotted line. When locking the film guide by pressing back the holder of the rollers, the stop 11 slides over the locking pin 9 and presses it down. When the roller-holder has reached its closed position, the locking pin-catches behind the stop 11 by the action of the leaf-spring 8 and thus secures the roller-holder in its working position. The space left for the passage of the film between the transporting drum and the pressure rollers can exactly be adjusted by the position of the locking pin.

What I claim is:

In a film transporting device in motion picture apparatus a film transporting drum, a swinging holder containing pressure rollers for pressing the film towards the film transporting drum, a bolt pivotally fixing one end of the roller-holder to the base-plate, a spring pressing the roller-holder in its open position away from the transporting drum, a locking pin and a releasing button mounted on a leaf-spring, which locking pin engages the roller-holder in its operative position.

In testimony whereof, I affix my signature.

LEO GOLDHAMMER.